(12) United States Patent
Honda

(10) Patent No.: US 7,548,275 B1
(45) Date of Patent: Jun. 16, 2009

(54) METHOD FOR INTERPOLATING A VIDEO SIGNAL

(75) Inventor: Hirofumi Honda, Yamanashi-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/262,595

(22) Filed: Mar. 5, 1999

(30) Foreign Application Priority Data

Mar. 9, 1998 (JP) .................................. 10-076608

(51) Int. Cl.
H04N 7/01 (2006.01)
H04N 11/20 (2006.01)

(52) U.S. Cl. .................. 348/448; 348/458; 382/300

(58) Field of Classification Search ................ 348/448, 348/449, 450, 458, 607, 618, 619, 621; 382/262, 382/299, 300, 260; H04N 7/01, 11/20, 5/21
See application file for complete search history.

(56) References Cited

U.S. PATENT DOCUMENTS

| | | | |
|---|---|---|---|
| 4,868,655 A * | 9/1989 | Choquet et al. ............. 358/140 |
| 5,124,794 A * | 6/1992 | Rabii .......................... 358/166 |
| 5,202,670 A * | 4/1993 | Oha ............................ 340/728 |
| 5,469,216 A * | 11/1995 | Takahashi et al. ........... 348/441 |
| 5,481,311 A * | 1/1996 | Boie .......................... 348/448 |
| 5,504,531 A * | 4/1996 | Kneet et al. ................ 348/452 |
| 5,638,134 A * | 6/1997 | Kameyama et al. ......... 348/607 |
| 5,661,525 A * | 8/1997 | Kovacevic et al. .......... 348/452 |
| 5,929,918 A * | 7/1999 | Marques Pereira et al. .. 348/448 |
| 5,995,154 A * | 11/1999 | Heimburger ................ 348/448 |
| 6,067,124 A * | 5/2000 | Shirahama et al. .......... 348/581 |
| 6,122,017 A * | 9/2000 | Taubman .................... 348/620 |
| 6,133,957 A * | 10/2000 | Campbell .................... 348/458 |
| 6,262,773 B1 * | 7/2001 | Westerman ................. 348/448 |

\* cited by examiner

*Primary Examiner*—Michael Lee
*Assistant Examiner*—Brian P. Yenke
(74) *Attorney, Agent, or Firm*—Arent Fox LLP

(57) ABSTRACT

A right side interpolation component and a left side interpolation component for each present pixel are calculated. The right side interpolation component of a present pixel on the left side of an assumption pixel to be interpolated is added to the left side interpolation component of another present pixel on the right side of the assumption pixel, thereby obtaining a pixel data for the assumption pixel. The right side interpolation component and the left side interpolation component are calculated based on a pixel data of a central present pixel and pixel data of present pixels around the central present pixel.

2 Claims, 2 Drawing Sheets

METHOD FOR INTERPOLATING A VIDEO SIGNAL

BACKGROUND OF THE INVENTION

The present invention relates to a method for interpolating a video signal.

In the plasma display panel (PDP), liquid crystal display panel (LCD), electroluminescence display device (EL), and others, the number of horizontal pixels at every scanning line, the number of scanning lines, and scanning frequency are set at predetermined values.

Therefore, in order to input a video signal of the NTSC system for displaying the video signal in a display device in which the number of horizontal pixels, the number of scanning lines and scanning frequency are set for the HDTV, it is necessary to covert the video signal so as to increase the number of horizontal pixels at every scanning line and the number of scanning lines.

FIG. 3 shows an example of a conventional method for producing interpolation pixels. At shown in the drawing, an interpolation component at the left side of each of pixels a to f is designated by a triangle l, and an interpolation component at the right side is designated by a square r. The value of each interpolation component is set to ½ of the pixel value. The interpolation component r at the right side of the present pixel at the left side of an assumption interpolation pixel x and the interpolation component l at the left side of the present pixel at the right side of the interpolation pixel x are added together, and the average is calculated. In other words, the average of pixel data of present pixels at both sides of the interpolation pixel x on the same scanning line is obtained, and the average is inserted between present pixels as a pixel data of the interpolation pixel.

However, in the average interpolation method peak values in the video signal are lost at the sampling and conversion to a digital signal. It is difficult to reproduce the lost peak value. Therefore, there is a problem that the picture is inferior in sharpness and picture quality.

SUMMARY OF THE INVENTION

An object of the present invention is to provide an interpolation method which may reproduce peak values, thereby realizing a good picture at a low cost.

According to the present invention, there is provided a method for interpolating a video signal having a plurality of present pixels comprising the steps of, calculating a right side interpolation component and a left side interpolation component for each of the present pixels, adding the right side interpolation component of a present pixel on the left side of an assumption pixel to be interpolated to the left side interpolation component of another present pixel on the right side of the assumption pixel, thereby obtaining a pixel data for the assumption pixel, wherein the right side interpolation component and the left side interpolation component are calculated based on a pixel data of a central present pixel and pixel data of present pixels around the central present pixel.

The method further comprises calculating an adjusting value based on a pixel data of a central present pixel and pixel data of present pixels around the central present pixel, setting a polarity of the adjusting value based on pixel data of a pair of present pixels on both sides of the central present pixel, calculating the right side interpolation component for the central present pixel based on a ½ value of the pixel data of the central present pixel and the adjusting value applied with a polarity, calculating the left side interpolation component for the central present pixel based on a ½ value of the pixel data of the central present pixel and the adjusting value applied with the polarity.

At least five sequential present pixels in a direction selected from a horizontal direction, vertical direction and oblique direction are used as the central present pixel and present pixels around the central pixel.

The method further comprise identifying pixel data of five sequential present pixels in a direction selected from a horizontal direction, vertical direction and oblique direction as a first pixel data, a second pixel data, a third pixel data, a fourth pixel data and a five pixel data in order, obtaining a first value obtained by adding together an absolute value of the difference between the first and second pixel data and an absolute value of the difference between the second and third pixel data, obtaining a second value obtained by adding together an absolute value of the difference between the second and third pixel data and an absolute value of the difference between the third and fourth pixel data, obtaining a third value obtained by adding together an absolute value of the difference between the third and fourth pixel data and an absolute value of the difference between the fourth and fifth pixel data, selecting a minimum value from the first, second and third values, multiplying the minimum value by a coefficient, setting a polarity of the minimum value multiplied by the coefficient by comparing the second pixel data with the fourth pixel data, calculating a right side interpolation component by adding together a ½ value of the third pixel data and the minimum value applied with a polarity and multiplied by the coefficient, calculating a left side interpolation component by subtracting the minimum value applied with a polarity and multiplied by the coefficient from the ½ value of the third pixel data.

These and other objects and features of the present invention will become more apparent from the following detailed description with reference to the accompanying drawings.

DETAILED DESCRIPTION OF THE PREFERRED EMBODIMENT

Figure 1:
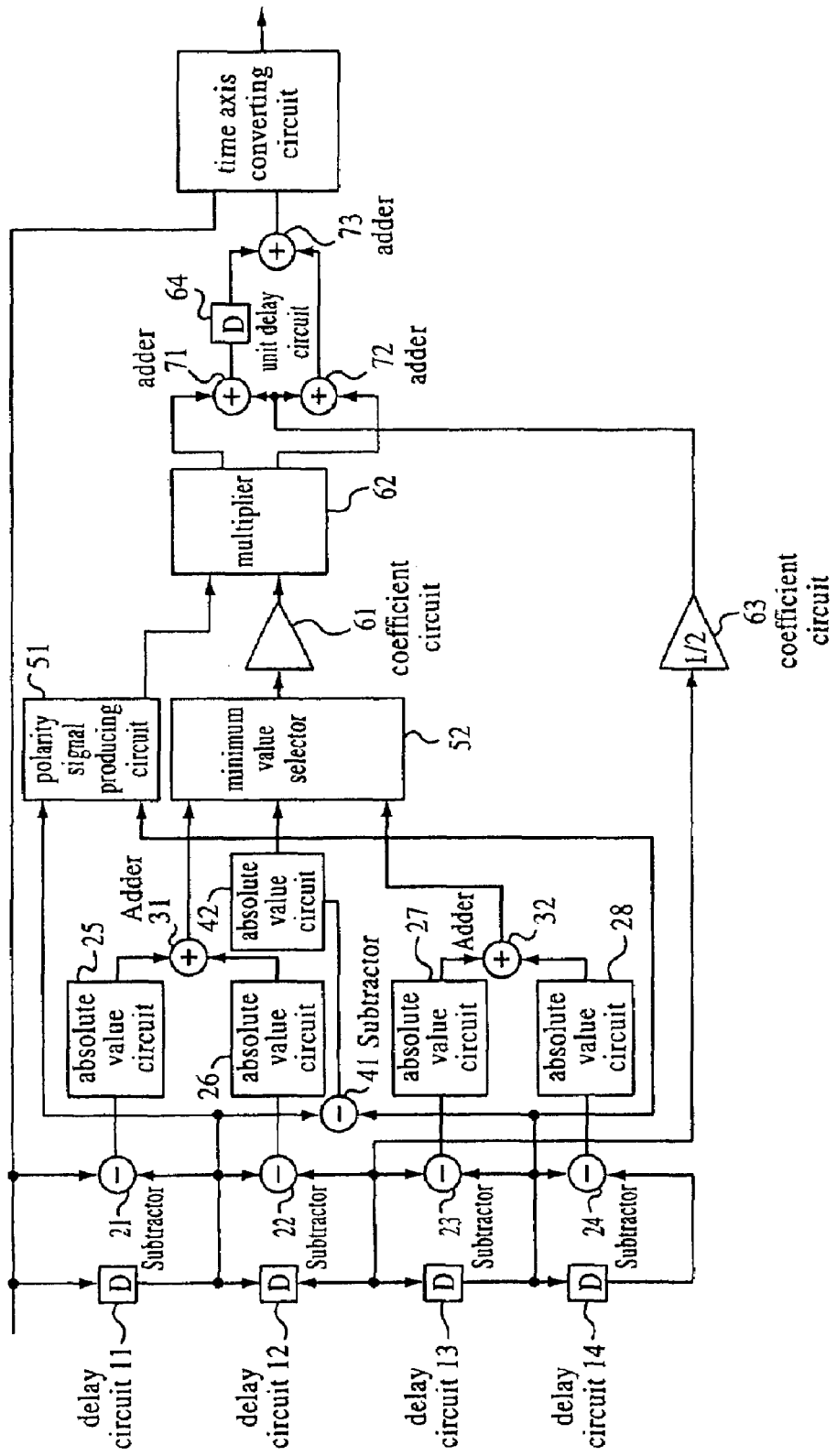
FIG. 1 is a block diagram for carrying out the method of the present invention.

Referring to FIG. 1 cascaded unit delay circuits 11 through 14 sequentially delay input picture signals (picture data) by a unit time. Each of the delay circuits 11-14 delays the picture signal by one pixel time D.

A subtracter 21 produces the difference between an input pixel data (0D) and a pixel data delayed by 1D. A subtracter 22 produces the difference between a pixel data delayed by 1D and a pixel data delayed by 2D. A subtracter 23 produces the difference between a pixel data delayed by 2D and a pixel data delayed by 3D. A subtracter 24 produces the difference between a pixel data delayed by 3D and a pixel data delayed by 4D.

Absolute value circuits 25 through 28 produce absolute values of differences applied from the subtracters 21-24, respectively.

An adder 31 adds together the absolute values from the absolute value circuits 25 and 26 and applies the sum to a minimum value selector 52. An adder 32 adds together the absolute values from the absolute value circuits 27 and 28 and applies the sum to the minimum value selector 52.

A subtracter 41 produces the difference between the pixel data delayed by 1D and the pixel data delayed by 3D. An absolute value circuit 42 produces an absolute value of the difference from the subtracter 41 and applies the absolute value to the minimum value selector 52.

A polarity signal producing circuit 51 produces a polarity signal based on the pixel data delayed by 1D and the pixel data delayed by 3D. More particularly, the polarity signal producing circuit 51 compares the pixel data delayed by 1D and the pixel data delayed by 3D, and produces a positive polarity (+) signal when the pixel data delayed by 1D is larger than the data of 3D delay, and produces a negative polarity (−) signal when the latter is larger than the former. The polarity signal is applied to a multiplier 62.

The minimum value selector 52 selects a minimum value from the absolute value of the two unit delay pixel data applied from the absolute value circuit 42, and absolute values of the sums of adjacent pixel data applied from the adders 31 and 32.

A coefficient circuit 61 multiplies the minimum value applied from the minimum value selector 52 by a coefficient, and the product is fed to the multiplier 62.

The multiplier 62 multiplies the polarity signal from the polarity signal producing circuit by the product from the coefficient circuit to produce an adjusting value for an interpolation component. Thus, the adjusting value for the interpolation component from the sequential five pixel data.

On the other hand, a coefficient circuit 63 multiplies the 2D delayed pixel data delayed by ½.

An adder 71 adds together the adjusting value from the multiplier 62 and the output of the coefficient circuit 63 to produce a sum (right side interpolation component). A subtracter 72 produces the difference (left side interpolation component) between the adjusting value from the multiplier 62 and the output of the coefficient circuit 63.

A unit delay circuit 64 delays the sum (right side interpolation component) from the adder by one pixel. The one pixel delayed right side interpolation component is added to the left side interpolation component from the subtracter by an adder 73. A time axis converting circuit 65 produces a picture signal in which a pixel is interpolated in the horizontal direction in accordance with the input pixel data and the interpolation pixel data from the adder 73.

Figure 2:
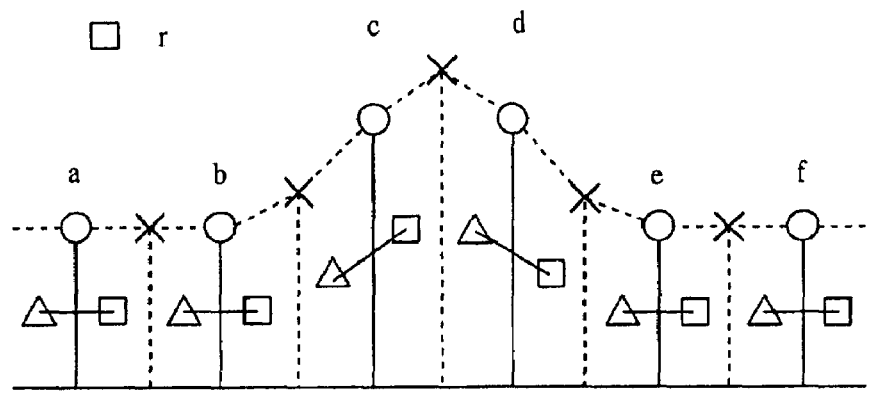
FIG. 2 is an illustration for explaining the method of the present invention.

The operation of the system will be described with reference to FIG. 2.

The method for an assumption interpolation pixel x between the third pixel c and the fourth pixel d will be described.

The unit delay circuits 11 through 14 sequentially delay input picture signals (picture data) by a unit time D. When the outputs of the delay circuits 11-14 become e, d, c, b, a, the subtracter 21 produces the difference (b−a) between the fourth pixel data and the fifth pixel data, the subtracter 22 produces the difference (c−b) between the third pixel data and the fourth pixel data, the subtracter 23 produces the difference (d−c) between the second pixel data and the third pixel data, and the subtracter 24 produces the difference (e−d) between the first pixel data and the second pixel data.

Absolute value circuits 25 through 28 produce absolute values of differences applied from the subtracters 21-24, respectively.

The adder 31 adds together the absolute values from the absolute value circuits 25 and 26 and applies the sum |c−d|+|d−e| to the minimum value selector 52. The adder 32 adds together the absolute values from the absolute value circuits 27 and 28 and applies the sum |a−b|+|b−c| to the minimum value selector 52.

The subtracter 41 produces the difference (b−d) between the second pixel data and the fourth pixel data. The absolute value circuit 42 produces the absolute value |b−d| of the difference from the subtracter 41 and applies the absolute value to the minimum value selector 52.

The minimum value selector 52 selects a minimum value k1 from the absolute value |b−d| of the difference, and absolute values (|a−b|+|b−c|), (|c−d|+|d−e|) of the sums.

The minimum value k1 is multiplied by ¼ at the coefficient circuit 61.

The polarity signal producing circuit 51 produces a polarity signal s1 based on the difference (d−b) between the second and fourth pixels. Since the difference is d−b>0, the polarity signal s1(+) is produced.

The multiplier 62 multiplies the polarity signal s1 (+) by the product k1/4 from the coefficient circuit to produce the adjusting value s1·k1/4 for an interpolation component.

On the other hand, the coefficient circuit 63 multiplies the third pixel data c by ½ to produce a value of c/2.

The adder 71 adds together the adjusting value s1·k1/4 and the output c/2 of the coefficient circuit 63 to produce the sum (c/2+s1·k1/4) as the right side interpolation component r on the right side of the third pixel. The subtracter 72 produces the difference (c/2−s1·k1/4) between the adjusting value (s1·k1/4) and the output (c/2) of the coefficient circuit 63 as the left side interpolation component l for the third pixel.

The right side interpolation component r for the third pixel c is delayed one pixel by the unit delay circuit 64.

Next, when the outputs of the delay circuits 11-14 become f, e, d, c, b, the subtracter 21 produces the difference (c−b), the subtracter 22 produces the difference (d−c), the subtracter 23 produces the difference (e−d), and the subtracter 24 produces the difference (f−e).

The adder 31 adds together the absolute values from the absolute value circuits 25 and 26 and applies the sum |e−f|+|d−e| to the minimum value selector 52. The adder 32 adds together the absolute values from the absolute value circuits 27 and 28 and applies the sum |c−d|+|b−c| to the minimum value selector 52.

The subtracter 41 produces the difference |c−e| between the second pixel data and the fourth pixel data. The absolute value circuit 42 produces the absolute value |c−e| of the difference from the subtracter 41 and applies the absolute value to the minimum value selector 52.

The minimum value selector 52 selects a minimum value k2 from the absolute value |c−e| of the difference, and absolute values (|c−d|+|b−c|), (|e−f|+|d−e|) of the sums.

The minimum value k2 is multiplied by ¼ at the coefficient circuit 61.

The polarity signal producing circuit 51 produces a polarity signal S2 based on the difference (e−c) between the third and fifth the pixels.

Since the difference is e−c<0, the polarity signal s2(−) is produced.

The multiplier 62 multiplies the polarity signal s2 (−) by the product k2/4 from the coefficient circuit to produce the adjusting value s2·k2/4 for an interpolation component.

On the other hand, the coefficient circuit 63 multiplies the fourth pixel data d by ½ to produce a value of d/2.

The adder 71 adds together the adjusting value s2·k1/4 and the output d/2 of the coefficient circuit 63 to produce the sum (d/2+s2·k2/4) as the right side interpolation component r on the right side of the fourth pixel.

The subtracter 72 produces the difference (d/2−s2·k2/4) between the adjusting value (s2·k2/4) and the output (d/2) of the coefficient circuit 63 as the left side interpolation component l for the fourth pixel.

The right side interpolation component r delayed one pixel by the delay circuit 64 for the third pixel c is added to the left side interpolation component l for the fourth pixel d by the adder 73, thereby producing an interpolation pixel x between the third and fourth pixels. The assumption interpolation pixel x is x=(c/2+s1·k1/4)+(d/2−s2·k2/4).

Since the signal s1 is positive (+) and the signal s2 is negative (−), the interpolation pixel is x between the third and fourth pixels $$x=(c/2+k1/4)+(d/2+k2/4)$$

Figure 3:
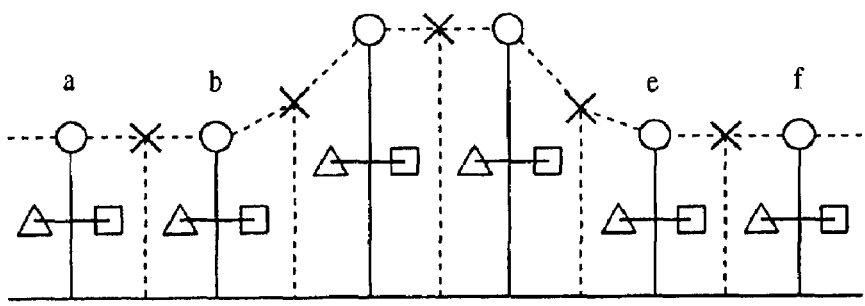
FIG. 3 is an illustration for explaining a conventional method.

Since there is the level difference between the right side interpolation pixel and the left side interpolation pixel on right and left sides of the present pixel, peak values can be effectively reproduced compared with the conventional method of FIG. 3 in which the interpolation pixel x between the third and fourth pixels is represented by (x=c/2+d/2).

Although, in the above described embodiment, the right and left side interpolation components on right and left sides of the present pixel are calculated based on the pixel data of the present pixel and the right and left side pixels on the same scanning line, the right and left interpolation components may be calculated based on pixel data of the present pixel and pixels at upper and lower positions or obliquely upper and lower pixels. In that case, unit delay circuits 11 through 14 and 64 are provided for delaying the input signal one pixel time.

In accordance with the present invention, it is possible to reproduce peak values which are lost at sampling, and to more steepen an edge of a contour.

While the invention has been described in conjunction with preferred specific embodiment thereof, it will be understood that this description is intended to illustrate and not limit the scope of the invention, which is defined by the following claims.

What is claimed is:

1. A method for interpolating a video signal having a plurality of present pixels comprising the steps of:

calculating an adjusting value based on a pixel data of a central present pixel and pixel data of present pixels around the central present pixel;

setting a polarity of adjusting value based on pixel data of a pair of present pixels on both sides of the central present pixel;

calculating a right side interpolation component for the central present pixel based on a ½ value of the pixel data of the central present pixel and the adjusting value applied with a polarity;

calculating a left side interpolation component for the central present pixel based on a ½ value of the pixel data of the central present pixel and the adjusting value applied with the polarity; and adding the right side interpolation component of a present pixel on the left side of an assumption pixel to be interpolated to the left side interpolation component of another present pixel on the right side of the assumption pixel, thereby obtaining a pixel data for the assumption pixel.

2. A method for interpolating a video signal having a plurality of present pixels comprising the steps of:

identifying pixel data of five sequential present pixels in a direction selected from a horizontal direction, vertical direction and oblique direction as a first pixel data, a second pixel data, a third pixel data, a fourth pixel data and a fifth pixel data in order;

obtaining a first value obtained by adding together an absolute value of the difference between the first and second pixel data and an absolute value of the difference between the second and third pixel data;

obtaining a second value obtained by adding together an absolute value of the difference between the second and third pixel data and an absolute value of the difference between the third and fourth pixel data;

obtaining a third value obtained by adding together an absolute value of the difference between the third and fourth pixel data and an absolute value of the difference between the fourth and fifth pixel data;

selecting a minimum value from the first, second and third values;

multiplying the minimum value by a coefficient, setting a polarity of the minimum value multiplied by the coefficient by comparing the second pixel data with the fourth pixel data;

calculating a right side interpolation component by adding together a ½ value of the third pixel data and the minimum value applied with the polarity and multiplied by the coefficient;

calculating a left side interpolation component by subtracting the minimum value applied with the polarity and multiplied by the coefficient from the ½ value of the third pixel data; and adding the right side interpolation component of a present pixel on the left side of an assumption pixel to be interpolated to the left side interpolation component of another present pixel on the right side of the assumption pixel, thereby obtaining a pixel data for the assumption pixel.

* * * * *